July 3, 1962

E. WILDHABER 3,041,858

UNIVERSAL JOINT

Filed April 10, 1961

INVENTOR:
Ernest Wildhaber

July 3, 1962  E. WILDHABER  3,041,858
UNIVERSAL JOINT
Filed April 10, 1961  2 Sheets-Sheet 2
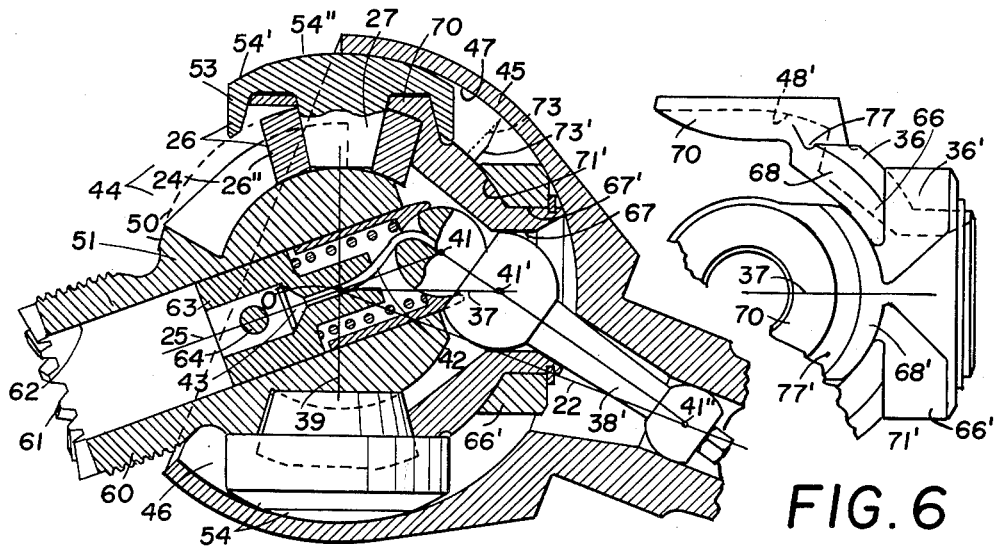
FIG. 4
FIG. 6
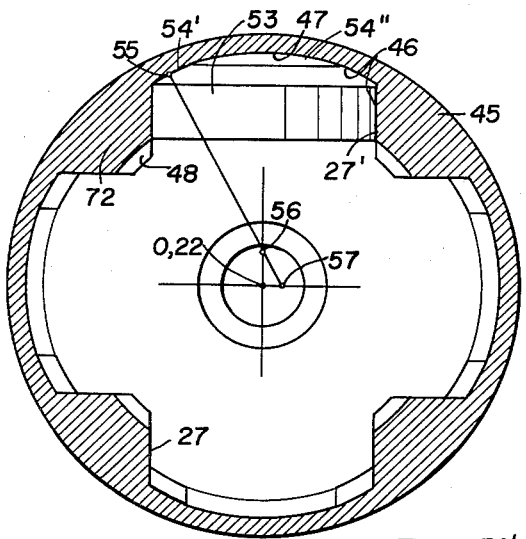
FIG. 5
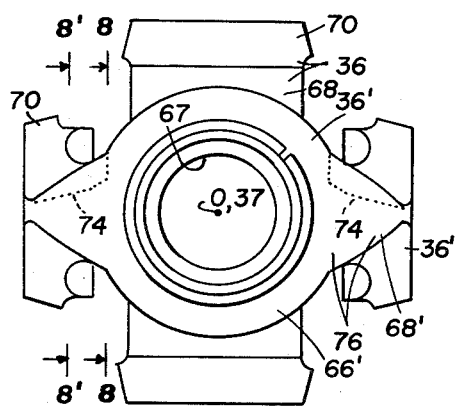
FIG. 7
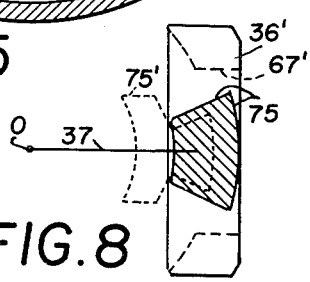
FIG. 8
*INVENTOR:*
Ernest Wildhaber

United States Patent Office 3,041,858
Patented July 3, 1962

3,041,858
UNIVERSAL JOINT
Ernest Wildhaber, Brighton, N.Y.
(124 Summit Drive, Rochester 20, N.Y.)
Filed Apr. 10, 1961, Ser. No. 101,965
13 Claims. (Cl. 64—21)

The present invention relates to constant-velocity universal joints of the general type disclosed in my patent application Serial No. 91,796, filed February 27, 1961.

Such joints comprise an outer member and an inner member each provided with ways uniformly spaced about an axis, and connecting elements engaging said ways to transmit torque between said members. Retaining means guide said connecting elements. The said two members may be pivotally attached and axially fixed to each other, or the two members may pivot on one another while leaving one member free to move along its axis.

One object of the present invention is to devise an axially free universal joint of this character, wherein the connecting elements have increased guidance. A further object is to devise retaining means for universal joints of this type that may be used interchangeably on axially free and on axially fixed universal joints. Another aim is to further define the retaining means for this type of universal joint.

Other objects will appear in the course of the specification and in the recital of the appended claims.

In the drawings:

FIG. 4 is an axial section of an axially fixed universal joint having retainers formed according to the present invention.

FIG. 5 is a cross-section through joint center O of the outer member of this universal joint, and an axial view looking from left to right in FIG. 4. An outer roller is also shown in one of the ways.

FIG. 6 is a fragmentary side view of the pair of retainers used in the joints of FIG. 4 and of FIG. 1.

FIG. 7 is an end view of the pair of retainers, looking from right to left in FIGS. 4 and 1.

FIG. 8 is a section taken along lines 8—8 of FIG. 7, looking in the direction of the arrows. FIG. 8 also shows in dotted lines a section along lines 8'—8' of FIG. 7.

Figures 1, 2, 3, 9:
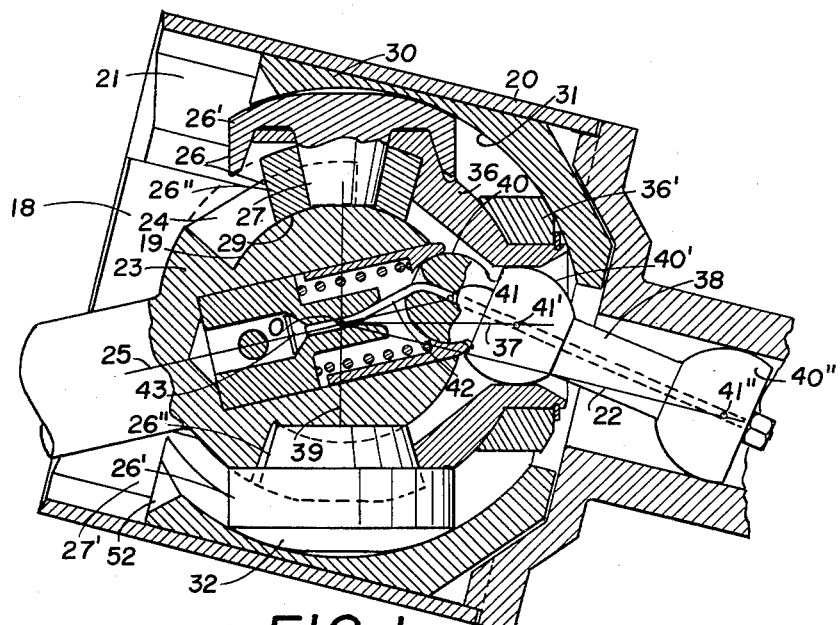
FIG. 1 is an axial section of an axially free universal joint embodying the invention.
FIG. 2 is an axial view of the outer member of this universal joint and of an insert used therewith, looking from left to right in FIG. 1.
FIG. 3 is a side view of said insert.
FIG. 9 is a fragmentary axial section of a modified retainer.

The universal joint 18 illustrated in FIGS. 1 to 3 comprises an outer member 20 having a plurality of ways 21 uniformly spaced about its axis 22, and an inner member 23 having ways 24 uniformly spaced about its axis 25. There are a plurality of connecting elements 26, each composed of two parts pivotally movable with respect to each other, as described in the aforesaid patent application, to which reference is made. The parts are embodied as an outer roller 26' and an inner roller 26" that is movable on a pivot 27 of the outer roller. Roller 26' engages a way 21 while roller 26" engages a way 24 adjacent thereto, to transmit torque between the members 20, 23.

The purpose of the relatively rotatable roller pairs 26', 26" is to enable the rollers to roll on their ways without sliding, at least in their midportion. Rollers or balls rigid with each other slide and roll on their ways. They have no region of pure rolling contact.

The ways 21 are straight and parallel to the axis 22 of member 20. They contain plane side surfaces 27'. The ways 24 extend about the center O, where the axes 22, 25 intersect. They have converging side profiles for engagement with tapered or conical inner rollers 26". As described in the aforesaid patent application, the taper of rollers 26" is determined so as to avoid a tilting moment on element 26 that comprises the two rollers 26', 26".

The universal joint 18 differs from the axially free universal joint disclosed in said application by employing an insert 30. Insert 30 fits into the ways 21. It modifies the ways 21 and provides a raised bottom surface 31 therein that is concave lengthwise. Surface 31 may be made a concave spherical surface centered at O. It is contacted by the convex end surface 32 of roller 26' and provides increased guidance for roller 26' and element 26, so that the roller axis remains securely in the required position pointing to center O.

The end surface 32 of roller 26' is a convex surface of revolution whose axial profile is preferably somewhat more curved than the profile of the concave bottom surface 31. Its arcuate profile on one side of its axis may have a center 33 (FIG. 2) while the profile of surface 31 is centered at O. The inner end surface 29 of roller 26" is a concave spherical surface matching the convex spherical bottom surface 19 of the ways 24.

Insert 30 contains as many arms 34 as there are ways 21, here four. They project outwardly and laterally from a common central portion 35. Insert 30 is axially slidable in the ways 21. It may be made of metal or non-metal, and can be made a molded part. As the insert provides only the light contact with the end surfaces 32, while the rollers 26' contact the plane sides 27' of the ways 21 directly and roll thereon, the universal joint adjusts itself easily to changes in axial position.

The members 20, 23 have preferably an even number of ways larger than two. Each pair of diametrically opposite elements 26 is guided by an individual retainer 36, 36'. The several retainers are mounted to oscillate relatively to each other about a common axis 37 that passes through the joint center O and is kept at right angles to the bisector plane 39 of the axes 22, 25 of members 20, 23. In the illustrated embodiment the retainers 36, 36' are interchangeable with the retainers of the axially fixed type universal joint to be described with FIGS. 4, 5. They will be described in detail hereafter.

To transmit uniform motion between the members 20, 23 the connecting elements 26 and particularly the roller axes are kept in the bisector plane by constraining the retainer axis 37 to stay at right angles to said plane. The means for doing this include a lever 38 with three spherical portions 40, 40', 40", whose centers 41, 41', 41" are constrained to move along the axes 25, 37, 22 respectively. Center 41 is displaced the least with increasing shaft angularity. Its displacement is effected with a flexible cable 42 anchored at 43 on member 23 and passing into lever 38. For details reference is made to the aforesaid patent application. The said means act on the retainers 36, 36' and maintain them in the required angular position.

The axially fixed type universal joint 44 (FIGS. 4, 5) has an outer member 45 whose ways 46 extend about the joint center O. Their concavely curved bottoms 47 are here directly built into member 45. They could however, also be produced with an insert or individual inserts, if desired to facilitate assembly.

Member 45 has a concave spherical inside surface 48 that contacts the convex spherical outside surface 50 of inner member 51. Both said surfaces are centered at O. Thus axial forces are directly transmitted between the members 45, 51.

The ways 46 of member 45 have plane side surfaces

27' that are parallel to its axis 22. They are engaged by cylindrical rollers 53.

The same numerals denote the same or equal parts or lines throughout.

The inner member 51 has ways 24 uniformly spaced about its axis 25. The ways 24 extend about the joint center O and opposite side surfaces of a way 24 are conical surfaces whose common axis passes through O. The bottoms of the ways 24 lie on a convex spherical surface centered at O. The ways 24 are formed like the ways 24 of universal joint 18, and are engaged by tapered rollers 26'' identical with those of joint 18. Each roller 26'' is mounted to turn on a pivot 27 that projects inwardly from a roller 53. The rollers 53, as illustrated, differ from the rollers 26' of joint 18 merely in their convex end surfaces. End surface 54 of a roller 53 comprises a ring-shaped portion 54' and a central spherical portion 54'' centered at O, as described in the aforesaid patent application.

Portion 54' is a surface of revolution coaxial with the roller. Its profile of an axial section has a changing distance from the joint center O. Thus the normal 55—56 (FIG. 5) at mean point 55 bypasses O. It intersects the roller axis at 56 and the axis O—57 of the bottom 47 at point 57. The profile of portion 54' may be made a circular arc centered at 56, and the profile of the cooperating bottom portion may be made a circular arc centered at 57. The contacting surface portions nearly match each other. They have low surface stresses and only moderate relative sliding.

Other roller combinations may also be used.

Member 51 contains a shank portion 60 whose outer end is formed as a toothed face-coupling member 61, for connection with a shaft portion. Its bore 62 contains a part 63 rigidly secured therein by a pin 64. Part 63 serves as the anchor 43 of a flexible steel-cable 42 which together with a lever 38' forms part of the constraining means that keep the rollers in the bisector plane 39 of the axes 22, 25. Lever 38' contains three spherical portions centered at 41, 41', 41'' respectively. Except for the diameter of the spherical portion centered at 41'' the constraining means are the same as in the axially free universal joint described with FIG. 1, and as described in said patent application.

The universal joint 44 contains two pairs of diametrically opposite connecting elements 26, each composed of rollers 53, 26''. Each pair of rollers is guided by an individual retainer 36, 36', as outlined for universal joint 18. The two retainers are mounted on each other to relatively turn on a common axis 37. This axis is kept at right angles to the bisector plane 39 by the constraining means already outlined, which contain lever 38' and act on the retainers 36, 36'.

*Assembly*

The universal joint 18 (FIG. 1) is assembled while the outer member 20 is kept out of the way at first.

An inner roller 26'' is inserted to a way 24 at the upper left of FIG. 1 before the constraining means are added. One of retainers 36, 36' is moved over it to align a holding ring with its bore. Then an outer roller is added, with its pivot 27 passing through said holding ring into said bore, while insert 30 is tilted out of the way. The insert may be recessed as at 52 to permit enough tilting. The roller pair 26', 26'' is moved back to the bisector plane, and the members 20, 23 are turned on their axes to move an adjacent pair of ways to filling position. Another pair of rollers is inserted, and the process is repeated until filling is completed. Then the constraining means are added that include lever 38, and that are to keep the connecting elements 26 in the bisector plane 39. The unit is then slid into the outer member 20 to complete the assembly.

The axially fixed type universal joint 44 is also assembled before adding the constraining means with lever 38'. The universal joint is set to its maximum shaft angularity shown in FIG. 4. A roller 26'' is inserted to the way 24 at its upper left end in FIG. 4. The retainers are then tilted about the joint center O to align a ring-shaped holding portion thereof with the bore of the inserted roller 26''. An outer roller 53 is added, so that its pivot 27 passes through said holding portion into the bore of the inner roller 26''. The retainers with the filled-in rollers are tilted back to operating position where the rollers are in said bisector plane. The members 45, 51 are turned on their axes 22, 25 to move another pair of ways into filling position, and the described procedure is repeated. After all the roller pairs are in place the axes 22, 25 are aligned, and the constraining means with lever 38' are inserted from the left through bore 62, past coupling member 61. Part 63 is secured to member 51 by pin 64, to complete the assembly.

It should be noted that the axially fixed type universal joint 44 is assembled with the outer member 45 in place, its center coinciding at O with the center of the inner member 51. During assembly the retainers 36, 36' are tilted with respect to the outer member 45 far beyond the tilt occurring in operation. The retaining means have to be shaped or cut out to permit such tilting. Specific forms thereof are parts of the present invention and will now be described.

*The Retainers*

The retainers are preferably so shaped that only one of the retainers (36') requires the extra cut-out. Each retainer 36, 36' has a central portion 66, 66' with bores 67, 67' respectively. A pair of arms 68 or 68' project outwardly and laterally from each of said central portions towards the pair of diametrically opposite elements 26 they are to hold. Each arm has a ring-shaped portion 70 at its end, whose opening is engaged by a pivot 27. Portion 70 is recessed into the outer roller, so that there is no thickness to separate the members 45, 51, as with conventional cages. They contact directly.

Preferably the inner surface 71' of retainer 36' is the continuation of the concave spherical inside surface 48 of assembled member 45; and the continuation of the spherical inside surface portion 48' of ring-shaped portion 70. The central portion 66' of retainer 36' and the adjacent arm portions thereof then lie between extended surface 48 and the bottom surface of member 45, while the central portion 66 of retainer 36 and its adjacent arm portions extend inwardly of continued surface 48 and out of collision reach with any part of member 45. The restriction as to arm thickness as caused by member 45 then applies only to retainer 36'.

The ways 46 of member 45 leave projections or teeth 72 (FIG. 5). The tooth ends lie on conical surfaces with axis 22 (FIG. 4) whose straight-line element 73 at the rear is shown in dotted lines. 73' is the side edge of the tooth end. When the retainers are tilted for filling-in the outer roller 53, the end edges of a pair of teeth 72 appear as dotted lines 74 (FIG. 7) with respect to retainer 36'. The arms 68' should be recessed or cut out sufficiently to permit this penetration. The penetration corresponds to a pivotal displacement of the retainers about center O larger than the pivotal displacement in operation at the maximum angularity of the axes 22, 25. It exceeds this operating displacement by at least one half thereof.

FIG. 8 illustrates a section 8—8 of FIG. 7 in full lines 75, bounding the cross-hatched area, and a section 8'—8' in dotted lines 75'. FIGS. 6 and 7 further illustrate the arm thickness in peripheral direction about the axis 37 of the retainers 36, 36' and of their bores 67, 67'. The arm thickness varies along the length of the arms, and is smaller adjacent the juncture 76 of the arms 68' with the central portion 66' than further away from said juncture.

It should also be noted that the retainer arms 68, 68' have each an arcuate groove (77, 77') on the outside surface adjacent its juncture with the ring-shaped holding portion 70. Each arm 68 has a shallow groove 77 (FIG. 6) that is coaxial with its holding portion 70. Each arm 68' of retainer 36' has a deep groove 77' coaxial with its holding portion.

The modified form of retainers 86, 86' shown in FIG. 9 may be used in place of the retainers 36, 36' (FIG. 1) to achieve further guidance with heavier parts. The concave surfaces 87, 88 of retainer 86 match the full width of the outside surfaces of the roller pair they hold. Retainer 86' has simliar surfaces for holding the rollers. The retainers 86, 86' are otherwise like the retainers 36, 36'. They are mounted to turn relatively to each other about a common axis 37.

*Elastic Deformations*

Like all parts the universal joints deflect under heavy load. To avoid undue shifting of the contact between the rollers and ways, the rollers or the ways may be crowned. This is a common remedy in general use on gear teeth. It deliberately restricts the contact to make it safer.

Preferably I adapt the thickness of the parts so that the contacting parts have approximately equal deflections. Thus for instance the teeth of the inner member providing the sides of the ways 24 lean back very slightly under heavy load. The pivots 27 that mount the inner rollers 26" also give slightly and lean back. A proper choice of thickness of the parts with respect to each other equalizes the deflection, so that the contact area does not shift appreciably. Highest load capacity is then achieved with little or no crowning. While such proportions may be computed, they are best determined experimentally.

I claim:

1. A universal joint comprising two members each having ways uniformly spaced about an axis, connecting elements engaging said ways to transmit torque between said members, retaining means for guiding said elements, said means reaching into the ways of one of said members, and means acting on said retaining means for maintaining said elements in the bisector plane of the axes of said two members at least approximately, said retaining means having arms shaped to permit displacement about the universal joint center exceeding the displacement required in operation at the largest angularity of the axes of said members by at least one half thereof, to facilitate assembly.

2. A universal joint comprising an outer member and an inner member each having ways uniformly spaced about an axis, rolling elements engaging said ways to transmit torque between said members, retaining means for guiding said elements, said means reaching into the ways of said outer member, and means acting on said retaining means for maintaining said elements in the bisector plane of the axes of said members at least approximately, said retaining means having arms reaching from a central portion towards said elements, the peripheral width of said arms varying along their length and being smaller adjacent their juncture with said central portion than further away therefrom.

3. A universal joint comprising an outer member and an inner member each having an even number and more than two ways uniformly spaced about an axis, connecting elements engaging said ways to transmit torque between said members, an individual retainer for each pair of diametrically opposite connecting elements, the several retainers being mounted to turn relatively to each other about a common axis, and means acting on said retainers for maintaining said common axis at right angles to the bisector plane of the axes of said members at least approximately, each of said retainers having a pair of arms projecting from a central portion towards its pair of connecting elements, the peripheral width of said arms varying on at least one retainer and being smaller adjacent the juncture of said arms with said central portion than further away from said juncture.

4. A universal joint comprising an outer member with spherical inside surface and an inner member each having four curved ways uniformly spaced about an axis, connecting elements engaging said ways to transmit torque between said members, an individual retainer for each pair of diametrically opposite elements, the two retainers being mounted on each other to turn relatively to each other about a common axis, and means acting on said retainers for maintaining said common axis at right angles to the bisector plane of the axes of said members at least approximately, each retainer having a central portion with a bore and arcuate arms extending from said central portion towards its pair of elements, the central portion of one of said retainers having an inner spherical surface that is the continuation of said spherical inside surface, and its arms having a varying peripheral width smaller adjacent their juncture with said central portion than further away therefrom.

5. In a universal joint, a retainer for guiding a pair of diametrically opposite connecting elements, said retainer having a central portion with a bore, a pair of arcuate arms projecting from said central portion towards said pair of elements, said arms having a varying peripheral width smaller adjacent their juncture with said central portion than further away therefrom.

6. In a universal joint, a retainer for guiding a pair of diametrically opposite connecting elements, said retainer having a central portion with a spherical inner surface and a bore therethrough, a pair of arcuate arms projecting from said central portion towards said pair of elements, a ring-shaped portion provided at the end of each of said arms for holding an element, the inner end of said ring-shaped portion lying on an extension of said spherical surface, said arms having a varying peripheral width smaller adjacent their juncture with said central portion than further away therefrom.

7. In a universal joint, a retainer for guiding a pair of diametrically opposite connecting elements, said retainer having a central portion with a bore, a pair of arcuate arms projecting from said central portion towards said pair of elements, said arms having a varying width smaller adjacent their juncture with said central portion than further away therefrom, a ring-shaped portion provided at the end of each of said arms for holding an element, and an arcuate groove coaxial with said ring-shaped portion provided on the outside of each arm adjacent said ring-shaped portion.

8. A universal joint according to claim 2, wherein said outer member contains straight ways parallel to its axis and wherein an insert portion fitting the bottom and sides of a way is provided in each of said straight ways to modify said way, the bottom of the way provided by the insert portion being concavely curved.

9. A universal joint comprising an outer member and an inner member each having ways uniformly spaced about an axis, the ways of said inner member being convex lengthwise, the ways of said outer member being straight and parallel to its axis, each of said straight ways containing an insert portion that provides a way with concavely curved bottom, connecting elements engaging the last-named ways and the ways of said inner member to transmit torque between said members, retaining means for guiding said elements, and means for keeping said elements in the bisector plane of the axes of said members at least approximately.

10. A universal joint comprising an outer member and an inner member each having ways uniformly spaced about an axis, the ways of said outer member being straight and parallel to its axis, a one-piece insert fitting into said ways and providing a raised bottom that is concavely curved lengthwise, connecting elements engaging the ways of both members to transmit torque between said members, said elements engaging also said concavely curved bottoms, retaining means for guiding said elements, and means acting on said retaining means for maintaining said elements in the bisector plane of the axes of said members.

11. A universal joint according to claim 10, wherein the side surfaces of the ways of said outer member are parallel planes.

12. A universal joint according to claim 10, wherein said insert is slidable along the ways of said outer member.

13. A universal joint comprising an outer member and an inner member each having an even number of ways larger than two uniformly spaced about an axis, the ways of said outer member being straight and parallel to its axis, an insert portion provided in each of said straight ways to modify said ways, the bottom of the way provided by said insert portion being concavely curved lengthwise, the ways of said inner member being convex lengthwise, connecting elements engaging said ways to transmit torque between said members, an individual retainer for each pair of diametrically opposite elements, the several retainers being mounted to turn relatively to each other about a common axis, and means acting on said retainers for maintaining said common axis at right angles to the bisector plane of the axes of said members, at least approximately.

References Cited in the file of this patent

UNITED STATES PATENTS

| | | |
|---|---|---|
| 1,436,785 | Thiemer | Nov. 28, 1922 |
| 2,239,675 | Hanft et al. | Apr. 29, 1941 |
| 2,551,779 | Wingquist | May 8, 1951 |
| 2,662,381 | Wildhaber | Dec. 15, 1953 |
| 2,914,930 | Wildhaber | Dec. 1, 1959 |